(12) United States Patent
Sakamoto et al.

(10) Patent No.: US 10,817,730 B2
(45) Date of Patent: Oct. 27, 2020

(54) PREDICTION APPARATUS, VEHICLE, PREDICTION METHOD, AND NON-TRANSITORY COMPUTER-READABLE STORAGE MEDIUM

(71) Applicant: HONDA MOTOR CO., LTD., Tokyo (JP)

(72) Inventors: Yosuke Sakamoto, Wako (JP); Kazuma Ohara, Wako (JP); Masamitsu Tsuchiya, Wako (JP); Umiaki Matsubara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 296 days.

(21) Appl. No.: 15/974,718

(22) Filed: May 9, 2018

(65) Prior Publication Data
US 2018/0349714 A1 Dec. 6, 2018

(30) Foreign Application Priority Data
Jun. 1, 2017 (JP) .................................. 2017-109302

(51) Int. Cl.
*G06K 9/00* (2006.01)
*B60W 30/095* (2012.01)
(Continued)

(52) U.S. Cl.
CPC ..... *G06K 9/00805* (2013.01); *B60W 30/0956* (2013.01); *G06K 9/00342* (2013.01);
(Continued)

(58) Field of Classification Search
CPC ............ G06K 9/00805; G06K 9/4652; G06K 9/00798; G06K 9/6201; G06K 9/00342;
(Continued)

(56) References Cited

U.S. PATENT DOCUMENTS 8,548,643 B2 * 10/2013 Asano .................... G08G 1/166
701/1
9,424,468 B2 * 8/2016 Shimizu ................. G08G 1/166
(Continued)

FOREIGN PATENT DOCUMENTS

JP 2012-238185 A 12/2012
JP 2016-177722 A 10/2016
(Continued)

OTHER PUBLICATIONS

Japanese Office Action (w/ partial translation) issued for Japanese Patent Application No. 2017-109302 dated Apri 8, 2019.

*Primary Examiner* — Jaime Figueroa
(74) *Attorney, Agent, or Firm* — Thomas Horstemeyer, LLP

(57) ABSTRACT

A prediction apparatus, comprising an acquisition unit configured to acquire peripheral information of an own vehicle, a determination unit configured to determine, based on the peripheral information, whether a behavior prediction target on a road visually recognizes a predetermined object, and a prediction unit configured to, if it is determined by the determination unit that the behavior prediction target visually recognizes the predetermined object, predict that the behavior prediction target moves across the road in a crossing direction.

15 Claims, 13 Drawing Sheets

(51) Int. Cl.
*G06K 9/62* (2006.01)
*G06K 9/46* (2006.01)

(52) U.S. Cl.
CPC ....... *G06K 9/00798* (2013.01); *G06K 9/4652* (2013.01); *G06K 9/6201* (2013.01); *B60W 2422/95* (2013.01); *B60W 2552/05* (2020.02); *B60W 2555/60* (2020.02); *G06K 9/00362* (2013.01)

(58) Field of Classification Search
CPC ....... B60W 30/0956; B60W 2554/402; B60W 2552/00; B60W 2540/225; B60W 40/04; G08G 1/16
USPC .................................................. 701/12, 28
See application file for complete search history.

(56) References Cited

U.S. PATENT DOCUMENTS

| | | | |
|---|---|---|---|
| 9,463,796 B2* | 10/2016 | Kaminade | B60W 30/0956 |
| 9,904,846 B2* | 2/2018 | Kindo | G08G 1/166 |
| 10,127,815 B2* | 11/2018 | Hernandez | G08G 1/005 |
| 10,586,254 B2* | 3/2020 | Singhal | B62D 15/0265 |
| 2010/0076621 A1* | 3/2010 | Kubotani | G08G 1/166 701/1 |
| 2012/0133497 A1* | 5/2012 | Sasaki | G06K 9/00805 340/425.5 |
| 2013/0223686 A1* | 8/2013 | Shimizu | G08G 1/166 382/103 |
| 2014/0219505 A1* | 8/2014 | Kindo | G06K 9/00805 382/103 |
| 2014/0333467 A1* | 11/2014 | Inomata | G01S 7/415 342/27 |
| 2015/0049908 A1* | 2/2015 | Ogawa | G06K 9/00335 382/103 |
| 2015/0353081 A1* | 12/2015 | Kaminade | G01S 13/931 701/1 |
| 2017/0329332 A1* | 11/2017 | Pilarski | B60W 30/0956 |
| 2018/0141562 A1* | 5/2018 | Singhal | G05D 1/0276 |
| 2019/0213887 A1* | 7/2019 | Kitayama | G08G 1/005 |

FOREIGN PATENT DOCUMENTS

| | | |
|---|---|---|
| JP | 2016-218873 A | 12/2016 |
| JP | 2018-005793 A | 1/2018 |
| WO | 2018/008314 A1 | 1/2018 |

* cited by examiner

PREDICTION APPARATUS, VEHICLE, PREDICTION METHOD, AND NON-TRANSITORY COMPUTER-READABLE STORAGE MEDIUM

BACKGROUND OF THE INVENTION

Field of the Invention

The present invention relates to an onboard prediction apparatus.

Description of the Related Art

Japanese Patent Laid-Open No. 2016-218873 describes predicting the possibility of crossing of a walker in front of an own vehicle, and after passing in front of the walker, capturing the walker who has started crossing on the rear side of the own vehicle in order to use the result of capturing the walker who crosses a road as a sample material for machine learning.

When driving, to implement safe driving, it is necessary to predict the behavior of a person on a road at a high accuracy.

SUMMARY OF THE INVENTION

It is an object of the present invention to increase the accuracy of behavior prediction of a person on a road.

One of the aspects of the present invention provides a prediction apparatus, comprising an acquisition unit configured to acquire peripheral information of an own vehicle, a determination unit configured to determine, based on the peripheral information, whether a behavior prediction target on a road visually recognizes a predetermined object, and a prediction unit configured to, if it is determined by the determination unit that the behavior prediction target visually recognizes the predetermined object, predict that the behavior prediction target moves across the road in a crossing direction.

Further features of the present invention will become apparent from the following description of exemplary embodiments with reference to the attached drawings.

DESCRIPTION OF THE EMBODIMENTS

Figure 1:
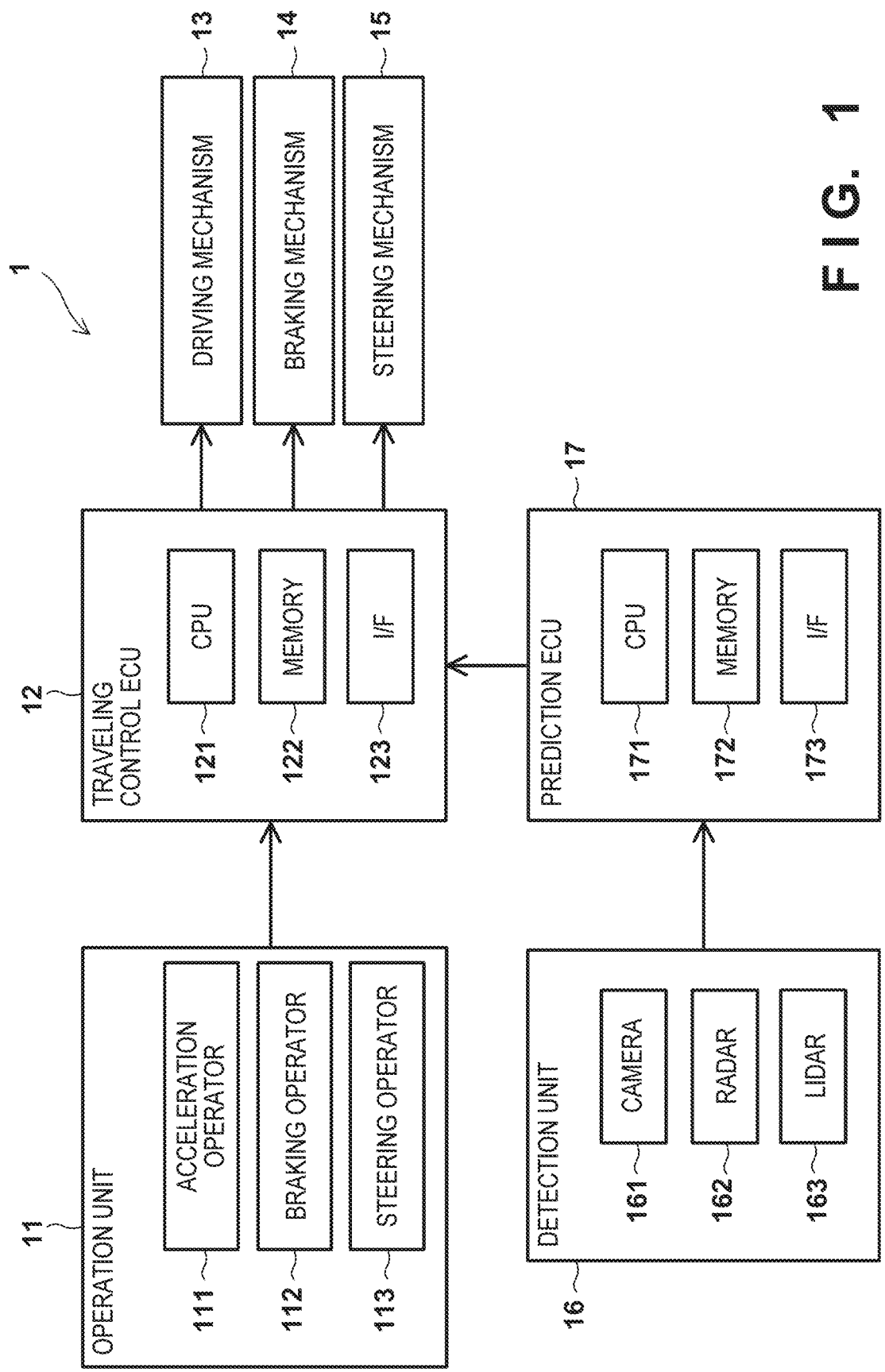
FIG. 1 is a block diagram for explaining an example of the arrangement of a vehicle.

Embodiments of the present invention will now be described with reference to the accompanying drawings. Note that the drawings are schematic views showing structures or arrangements according to the embodiments, and the dimensions of members shown in the drawings do not necessarily reflect the actuality. In addition, the same reference numerals denote the same members or same constituent elements throughout the drawings, and a repetitive description thereof will be omitted.

First Embodiment

FIG. 1 is a block diagram for explaining the arrangement of a vehicle 1 according to the first embodiment. The vehicle 1 includes an operation unit 11, a traveling control ECU (Electronic Control Unit) 12, a driving mechanism 13, a braking mechanism 14, a steering mechanism 15, a detection unit 16, and a prediction ECU 17. Note that in this embodiment, the vehicle 1 is a four-wheeled vehicle. However, the number of wheels is not limited to four.

The operation unit 11 includes an acceleration operator 111, a braking operator 112, and a steering operator 113. Typically, the acceleration operator 111 is an accelerator pedal, the braking operator 112 is a brake pedal, and the steering operator 113 is a steering wheel. These operators 111 to 113 may use operators of another type such as a lever type or a button type.

The traveling control ECU 12 includes a CPU 121, a memory 122, and a communication interface 123. The CPU 121 performs predetermined processing based on an electric signal received from the operation unit 11 via the communication interface 123. The CPU 121 stores the processing result in the memory 122 or outputs it to the mechanisms 13 to 15 via the communication interface 123. With this arrangement, the traveling control ECU 12 controls the mechanisms 13 to 15.

The traveling control ECU 12 is not limited to this arrangement, and a semiconductor device such as an ASIC (Application Specific Integrated Circuit) may be used as another embodiment. That is, the function of the traveling control ECU 12 can be implemented by either hardware or software. In addition, the traveling control ECU 12 has been described here as a single element to facilitate the explanation. However, this may be divided into a plurality of ECUs. The traveling control ECU 12 may be divided into, for example, three ECUs for acceleration, braking, and steering.

The driving mechanism 13 includes, for example, an internal combustion engine and a transmission. The braking mechanism 14 is, for example, a disc brake provided on each wheel. The steering mechanism 15 includes, for example, a power steering. The traveling control ECU 12 controls the driving mechanism 13 based on the operation amount of the acceleration operator 111 by the driver. In addition, the traveling control ECU 12 controls the braking mechanism 14 based on the operation amount of the braking operator 112 by the driver. Furthermore, the traveling control ECU 12 controls the steering mechanism 15 based on the operation amount of the steering operator 113 by the driver.

Figure 2:
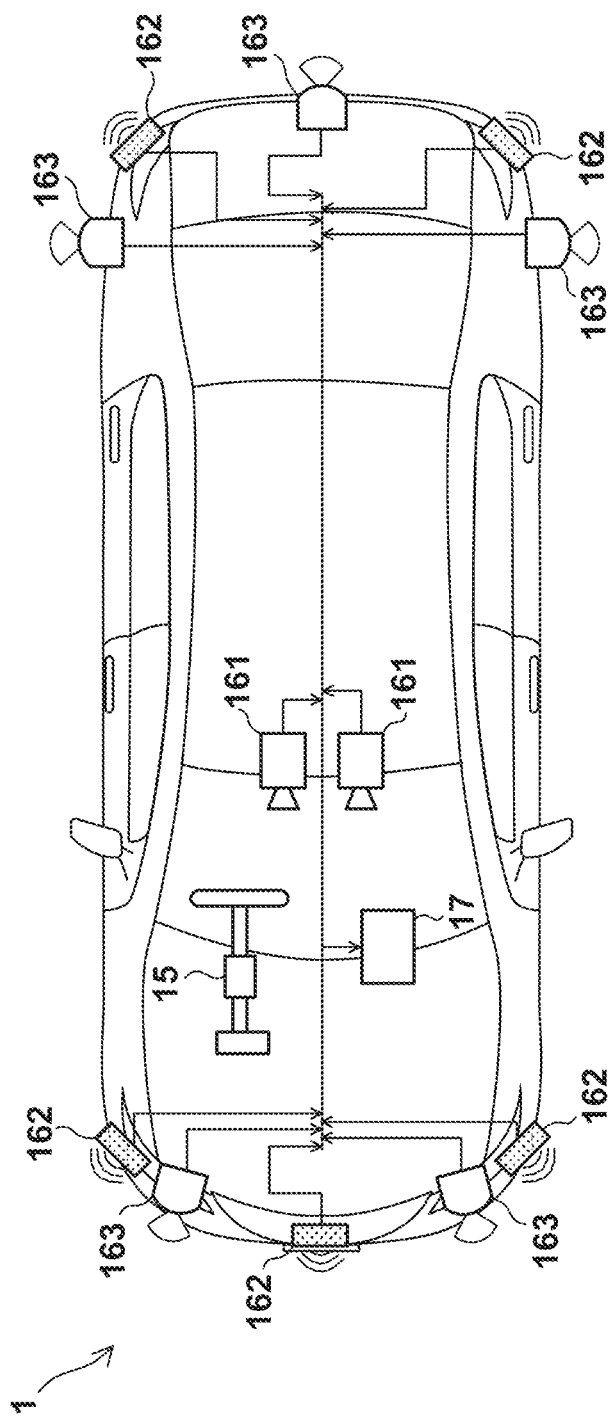
FIG. 2 is a plan view for explaining an example of the arrangement position of a detection unit.

The detection unit 16 includes a camera 161, a radar 162, and a LiDAR (Light Detection and Ranging) 163. The camera 161 is, for example, an image capturing apparatus using a CCD/CMOS image sensor. The radar 162 is, for example, a distance measuring apparatus such as a millimeter-wave radar. The LiDAR 163 is, for example, a distance measuring apparatus such as a laser radar. These apparatuses are arranged at positions where peripheral information of the vehicle 1 can be detected, for example, on the front side, rear side, upper side, and lateral sides of the vehicle body, as shown in FIG. 2.

Here, in this specification, expressions "front", "rear", "upper", and "lateral (left/right)" are used in some cases. These are used as expressions representing relative directions with respect to the vehicle body. For example, "front" represents the front side in the longitudinal direction of the vehicle body, and "upper" represents the height direction of the vehicle body.

The vehicle 1 can perform automated driving based on a detection result (peripheral information of the vehicle 1) of the detection unit 16. In this specification, automated driving means partially or wholly performing the driving operation (acceleration, braking, and steering) not on the driver side but on the side of the traveling control ECU 12. That is, the concept of automated driving includes a form (so-called full automated driving) in which the driving operation is wholly performed on the side of the traveling control ECU 12 and a form (so-called driving support) in which part of the driving operation is performed on the side of the traveling control ECU 12. Examples of driving support are a vehicle speed control (automatic cruise control) function, a following distance control (adaptive cruise control) function, a lane departure prevention support (lane keep assist) function, a collision avoidance support function, and the like.

The prediction ECU 17 predicts the behavior of each object on a road, as will be described later in detail. The prediction ECU 17 may be referred to as a prediction apparatus, a behavior prediction apparatus, or the like, or may be referred to as a processing apparatus (processor), an information processing apparatus, or the like (may also be referred to not as an apparatus but as a device, a module, a unit, or the like). When performing automated driving, the traveling control ECU 12 controls some or all of the operators 111 to 113 based on a prediction result of the prediction ECU 17.

The prediction ECU 17 has the same arrangement as the traveling control ECU 12, and includes a CPU 171, a memory 172, and a communication interface 173. The CPU 171 acquires peripheral information of the vehicle 1 from the detection unit 16 via the communication interface 173. The CPU 171 predicts the behavior of each object on a road based on the peripheral information, and stores the prediction result in the memory 172 or outputs it to the traveling control ECU 12 via the communication interface 173.

Figure 3:
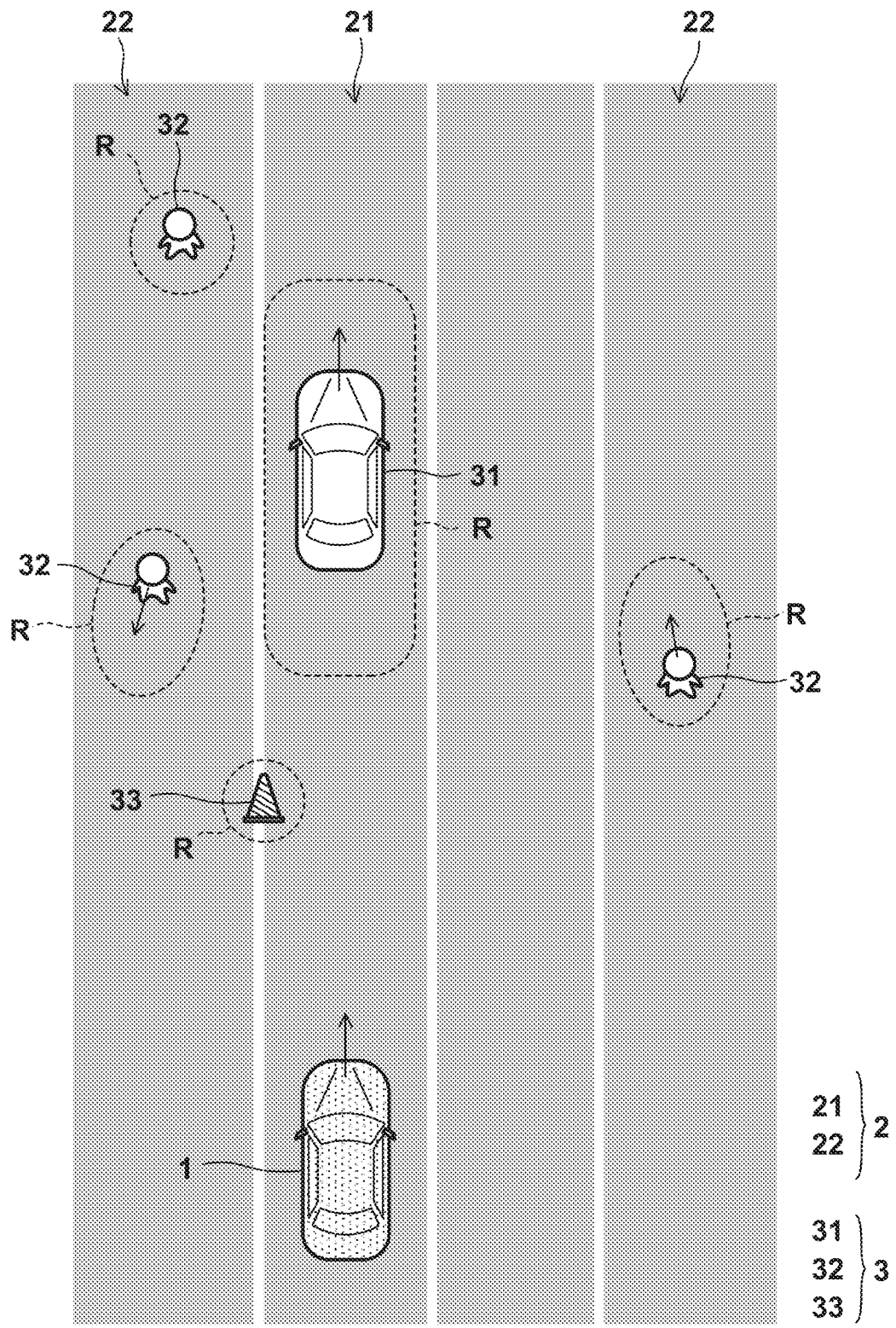
FIG. 3 is a plan view for explaining an example of a method of setting a warning region for each object on a road.

FIG. 3 is a plan view showing a state in which the vehicle 1 and a plurality of objects 3 exist on a road 2, and shows a state in which the vehicle 1 (to be referred to as an "own vehicle 1" hereinafter for the sake of discrimination) is traveling on a roadway 21 by automated driving. The own vehicle 1 detects the objects 3 on the roadway 21 and sidewalks 22 by the detection unit 16, and sets a traveling route so as to avoid the objects, thereby performing automated driving. Here, examples of the objects 3 are another vehicle 31, persons 32 (for example, walkers), and an obstacle 33. Note that as for each object 3 with an arrow, the arrow indicates the traveling direction of the object 3.

Note that a road cone is illustrated here as the obstacle 33. However, the obstacle 33 is not limited to this example as long as it is an object that physically interrupts traveling or an object for which avoidance of contact is recommended. The obstacle 33 may be, for example, a fallen object such as garbage, may be an installed object such as a traffic signal or a guard fence, and may be either a movable or an immovable.

As shown in FIG. 3, if the plurality of objects 3 are confirmed from the detection result (peripheral information of the vehicle 1) of the detection unit 16, the prediction ECU 17 sets a warning region R for each object 3. The warning region R is a region used to avoid contact of the own vehicle 1, that is, a region recommended not to overlap the own vehicle 1. The warning region R for a given object 3 is set, as a region in which the object 3 can move within a predetermined period, such that it has a predetermined width outside the outline of the object 3. The warning region R is set (changed, updated, or reset: to be simply referred to as "set" hereinafter) periodically, for example, every 10 [msec].

Note that the warning region R is represented here by a plane (two dimensions) to facilitate the explanation. In fact, the warning region R is set in accordance with a space detected by the onboard detection unit 16. For this reason, the warning region R can be expressed by three-dimensional space coordinates or can be expressed by four-dimensional space coordinates including the time base.

The prediction ECU 17 sets the warning region R for, for example, the other vehicle 31 traveling in front of the own vehicle 1 outside the outline of the other vehicle 31. The width (the distance from the outline) of the warning region R is set based on the information of the other vehicle 31 (for example, position information such as the position relative to the own vehicle 1 and the distance from the own vehicle 1 and state information such as the traveling direction and the vehicle speed of the other vehicle 31 and the presence/absence of lighting of a lighting device). For example, the widths of the warning region R can be set so as to be different from each other on the front side, the lateral sides, and the rear side. For example, when the other vehicle 31 is traveling in a straight line, the prediction ECU 17 sets the warning region R such that it has a predetermined width (for example, about 50 cm) on each lateral side of the vehicle body and a relatively large width (a width according to the vehicle speed of the other vehicle 31) on the front and rear sides of the vehicle body. When the other vehicle 31 makes a left turn (or a right turn), the prediction ECU 17 increases the width on the left side (or the right side) of the warning region R. In addition, when the other vehicle 31 stops, the warning region R may be set in the same width on the front side, the lateral sides, and the rear side.

In addition, the prediction ECU 17 sets the warning region R for, for example, the person 32 on the sidewalk 22 outside the outline of the person 32 based on the information of the person 32 (for example, position information such as the position relative to the own vehicle 1 and the distance from the own vehicle 1 and state information such as the moving direction, the moving speed, the posture, and the line of sight of the person 32). For example, the widths of the warning region R can be set based on the information of the person 32 so as to be different from each other on the front side, the lateral sides, and the rear side. For example, the width of the warning region R is set based on the moving speed of the person 32 and/or set based on the line of sight of the person 32. When the person 32 is at a standstill, the warning region R may be set in the same width on the front side, the lateral sides, and the rear side.

Additionally, the prediction ECU 17 can also predict the age bracket of the person 32 and set the width of the warning region R based on the prediction result. This prediction is done using the outer appearance information (the information of the outer appearance of the person such as physique information and clothing information) of the person 32 based on the detection result from the detection unit 16.

Furthermore, the prediction ECU 17 sets the warning region R for, for example, the obstacle 33 on the roadway 21 outside the outline of the obstacle 33 based on the information of the obstacle 33 (for example, position information such as the position relative to the own vehicle 1 and the distance from the own vehicle 1 and state information such as the type, shape, and size). Since it is considered that the obstacle 33 does not move, the width of the warning region R may be set to a predetermined value. If the detection unit 16 further includes, for example, a wind velocity sensor and can detect a wind velocity, the width of the warning region R may be set based on the wind velocity.

The width of the warning region R for each object 3 may further be set based on the vehicle speed of the own vehicle 1. When the own vehicle 1 is traveling at a relatively high speed, for example, the width of a warning region R for the other vehicle 31 is set relatively large. This makes it possible to keep a sufficient following distance to the other vehicle 31 and avoid contact with the other vehicle 31.

Based on the prediction result from the prediction ECU 17, the traveling control ECU 12 sets a traveling route not to pass through the warning region R for each object 3, thereby preventing the own vehicle 1 from coming into contact with each object 3.

Figure 4A:
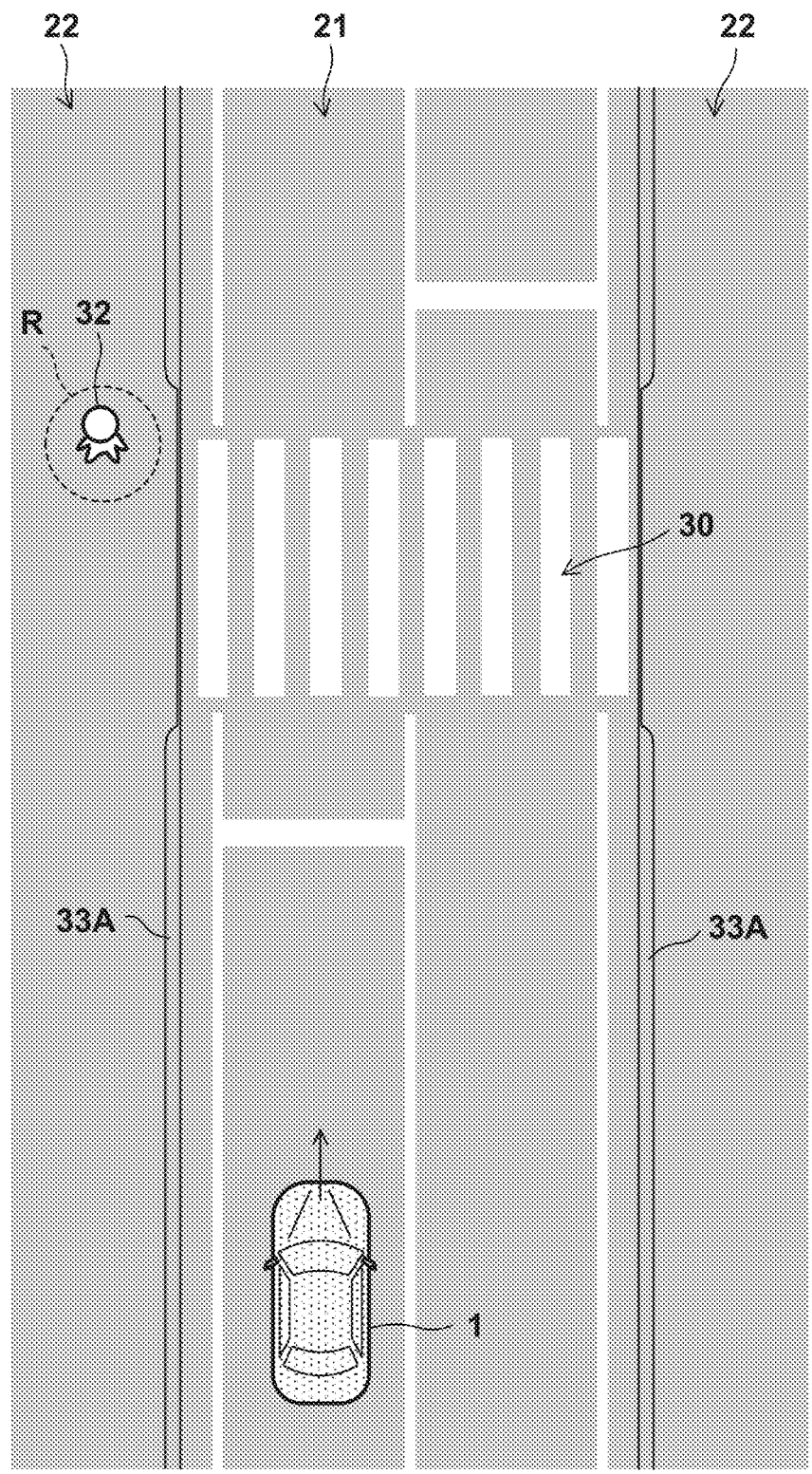
FIG. 4A is a plan view for explaining an example of a method of predicting crossing of a walker.

FIG. 4A is a plan view showing a state in which the own vehicle 1 is traveling toward a crosswalk 30 on the roadway 21 by automated driving. In this embodiment, the sidewalk 22 is partitioned from the roadway 21 by a step 33A, and the person 32 exists on the sidewalk 22.

Note that in FIG. 4A, as for the step 33A, a portion represented by a large width corresponds to a portion where the difference of elevation is large, and a portion represented by a small width corresponds to a portion where the difference of elevation is small. That is, FIG. 4A shows that the difference of elevation between the roadway 21 and the sidewalk 22 is small near the crosswalk 30.

As another embodiment, the roadway 21 and the sidewalk 22 may be partitioned by a curb or the like or may be partitioned only by a line marking (a white line or the like). Alternatively, the road may be a road in which the sidewalk and the roadway are not partitioned.

As described above (see FIG. 3), the prediction ECU 17 of the own vehicle 1 sets the warning region R for the person 32 based on the information (position information, state information, and the like) of the person. The person 32 is assumed here to be at a standstill on the sidewalk 22, but may be moving at a predetermined speed.

Note that although the crosswalk 30 is a part of the road 2, it can be specified as one of the objects 3 based on the detection result of the detection unit 16 because the crosswalk 30 is indicated by white lines on the road 2 and can be visually recognized in general. However, the warning region R is not set for the crosswalk 30 (alternatively, the width of the warning region R is set to zero).

Figure 4B:
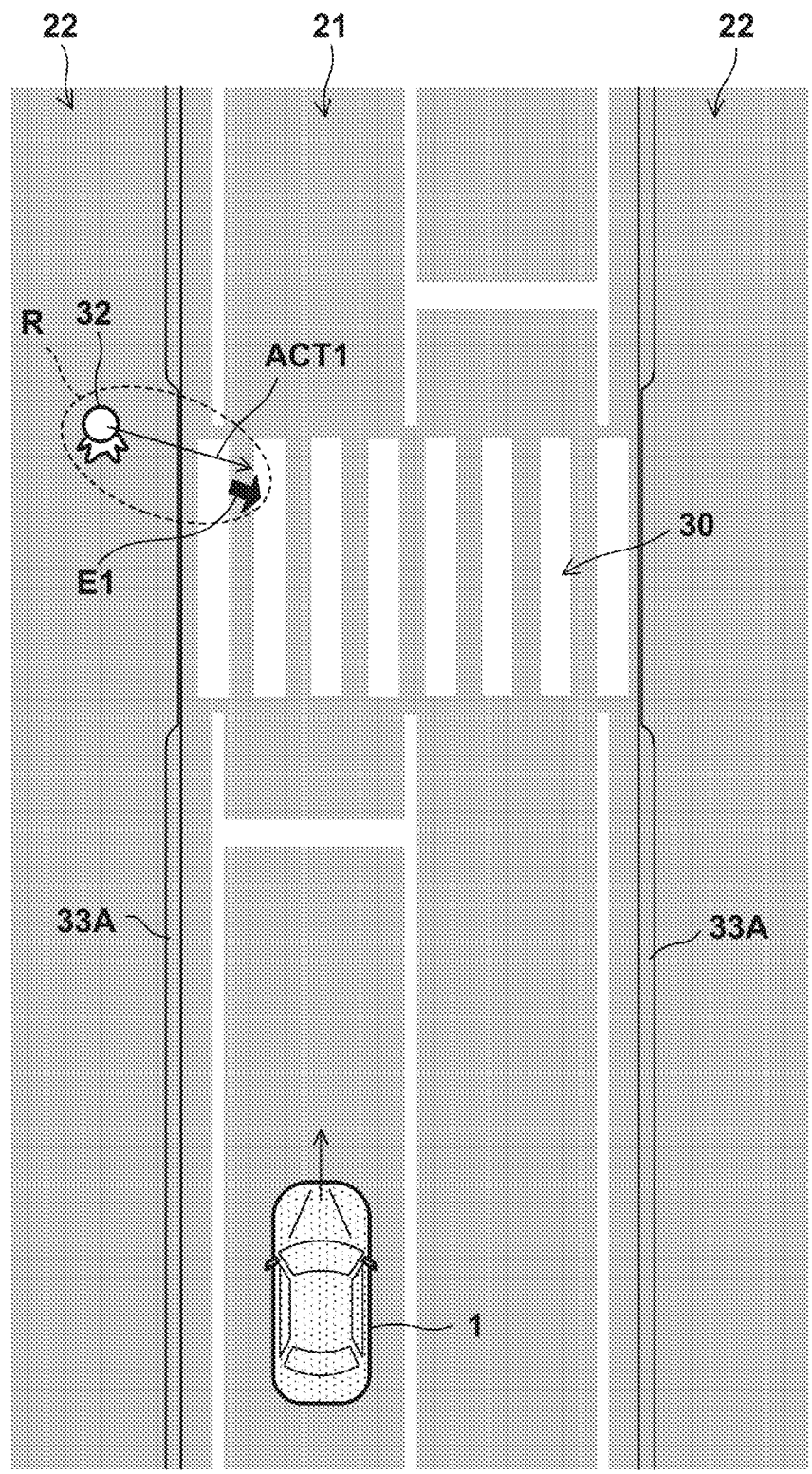
FIG. 4B is a plan view for explaining an example of the method of predicting crossing of the walker.

Here, as shown in FIG. 4B, in a case in which the person 32 visually recognizes the crosswalk 30 (ACT1), it can be considered that the person 32 has a desire to move across the roadway 21 through the crosswalk 30. Hence, in a case in which it is confirmed that the person 32 visually recognizes the crosswalk 30 (ACT1), the prediction ECU 17 expands the warning region R to the side of the crosswalk 30/the side of the roadway 21, as indicated by an arrow E1, based on the result of predicting that the person 32 moves in the crossing direction.

The case in which it is confirmed that the person 32 visually recognizes a certain object (in this embodiment, the crosswalk 30) indicates a case in which the prediction ECU 17 determines that the object exists in the direction of line of sight (on the line of sight) of the person 32, as will be described later in detail. This determination is done based on the detection result of the detection unit 16. FIG. 4A shows the direction of line of sight on the plan view to facilitate the explanation. However, the direction of line of sight is preferably considered even for the vertical direction (that is, the direction perpendicular to the road 2), and this can increase the accuracy of the determination. That is, the direction of line of sight of the person 32 is preferably expressed by three-dimensional space coordinates.

Based on the warning region R set in the above-described way, the traveling control ECU 12 can decide how to perform the driving operation of the own vehicle 1. For example, the traveling control ECU 12 can decide to decelerate the own vehicle 1 based on the expanded warning region R (arrow E1). Additionally, for example, if the person 32 starts crossing the roadway 21, the traveling control ECU 12 can decide to stop the own vehicle 1 until the crossing is completed.

Figure 5A:
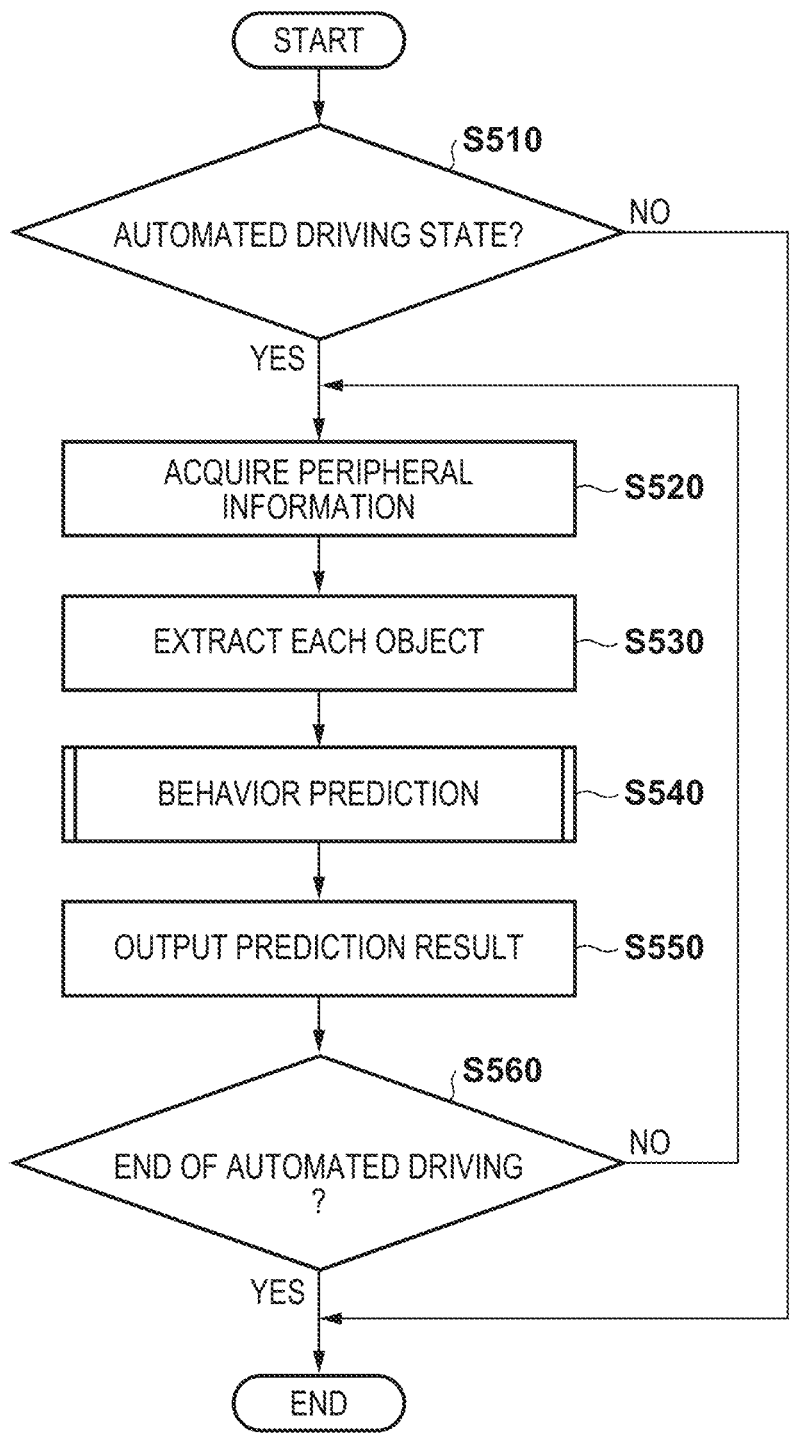
FIG. 5A is a flowchart for explaining an example of a prediction method of a prediction ECU.
Figure 5B:
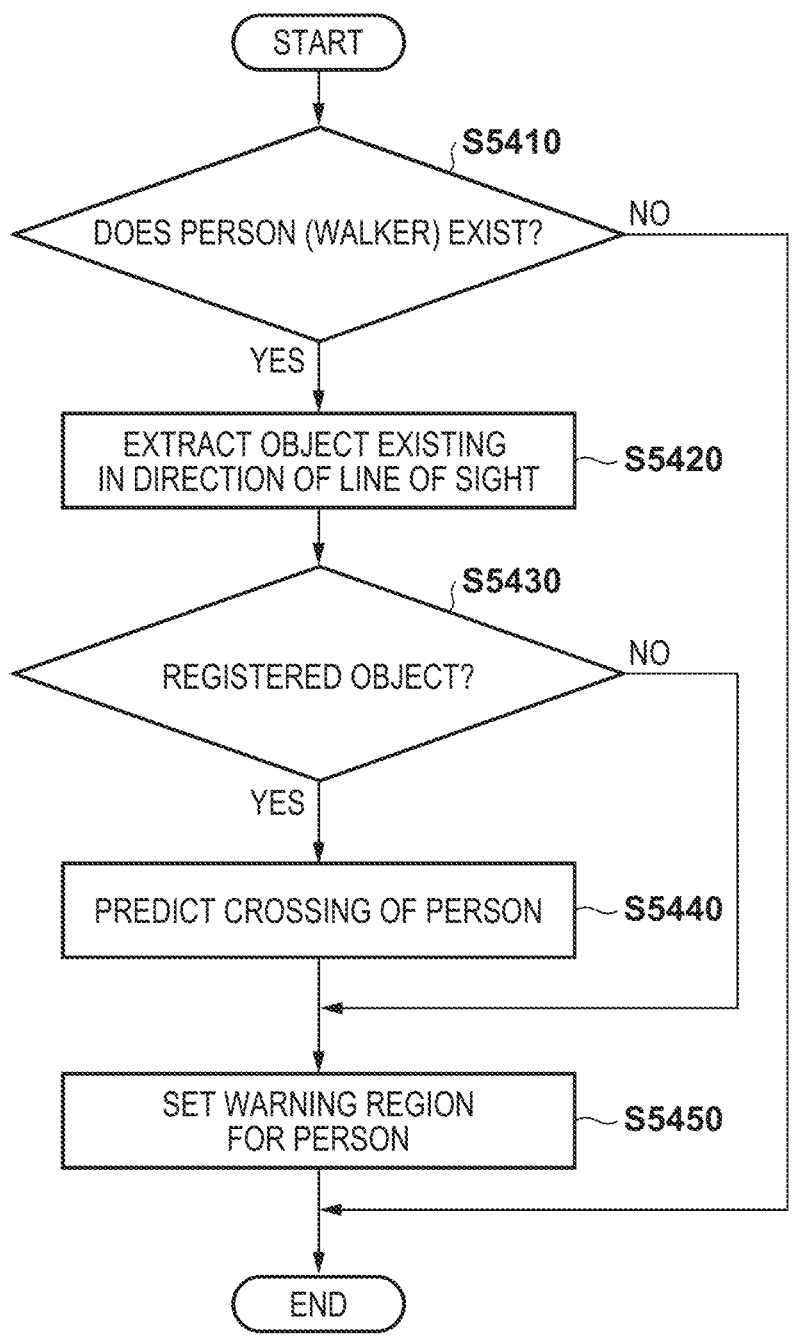
FIG. 5B is a flowchart for explaining an example of the prediction method of the prediction ECU.

FIGS. 5A and 5B are flowcharts showing a method of performing behavior prediction of the person 32 according to this embodiment and a method of setting the warning region R associated with the behavior prediction. The contents of the flowcharts are mainly performed by the CPU 171 in the prediction ECU 17.

When the own vehicle 1 starts automated driving, the prediction ECU 17 recognizes each object 3 on the periphery of the own vehicle 1 based on the peripheral information of the own vehicle 1, sets the warning region R for each object 3, and outputs the result to the traveling control ECU 12. Under such circumstances, the prediction ECU 17 performs behavior prediction of the person 32 based on what the person 32 visually recognizes, and sets the warning region R for the person 32 based on the prediction result.

Referring to FIG. 5A, in step S510 (to be simply referred to as "S510" hereinafter, and this also applies to other steps), it is determined whether the own vehicle 1 is in an automated driving state. This step is performed by, for example, receiving, by the prediction ECU 17, a signal representing whether the own vehicle 1 is in the automated driving state from the traveling control ECU 12. If the own vehicle 1 is in the automated driving state, the process advances to S520. If the own vehicle 1 is not in the automated driving state, the flowchart ends.

In S520, the peripheral information of the own vehicle 1 is acquired. This step is performed by receiving, by the prediction ECU 17, the peripheral information of the own vehicle 1 detected by the detection unit 16.

In S530, each object 3 existing on the periphery of the own vehicle 1 is extracted from the peripheral information obtained in S520. This step is performed by performing predetermined data processing (for example, data processing of performing outline extraction) for data representing the peripheral information.

Each object 3 is classified on an attribute (type) basis based on the information (the above-described position information, state information, and the like) of the object (for example, it is determined which one of the other vehicle 31, the person 32, and the obstacle 33 corresponds to the object). This classification can be done by, for example, pattern matching based on the outer appearance of each object 3. In addition, the warning region R can be set for each object 3. In this embodiment, the warning region R for the person 32 is set based on behavior prediction (S540) to be described later. However, the warning region R for each of the remaining objects 3 can be set in S530.

In S540, behavior prediction of the person 32 is performed based on an object existing in the direction of line of sight of the person 32, as will be described later in detail (see FIG. 5B).

In S550, a prediction result including the behavior prediction in S540 is output to the traveling control ECU 12. Based on the prediction result, the traveling control ECU 12 decides the traveling route of the own vehicle 1 and decides the contents of the driving operation of the own vehicle 1.

In S560, it is determined whether to end the automated driving state of the own vehicle 1. This step is performed by, for example, receiving, by the prediction ECU 17, a signal representing the end of the automated driving state from the traveling control ECU 12. If the automated driving state is not to be ended, the process returns to S520. If the automated driving state is to be ended, the flowchart ends.

The series of steps S520 to S560 are repetitively performed in a period of, for example, about several ten [msec] or a shorter period (for example, about 10 [msec]). That is, acquisition of the peripheral information of the own vehicle 1, behavior prediction of each object 3 on the periphery of the own vehicle 1 and associated setting of the warning region R, and output of the results to the traveling control ECU 12 are periodically performed.

FIG. 5B is a flowchart for explaining a method of behavior prediction in S540. S540 includes S5410 to S5450, and behavior prediction of the person 32 is performed based on a result of determining whether the person 32 visually recognizes a predetermined object. The warning region R for the person 32 is then set based on the prediction result.

In S5410, it is determined whether the person 32 (a walker or the like) exists among the objects 3 extracted in S530. If the person 32 exists, the process advances to S5420. Otherwise, the flowchart ends.

In S5420, the object 3 (considered to be) visually recognized by the person 32 confirmed in S5410 is extracted. This is performed by selecting the object 3 existing in the direction of line of sight of the person 32 from the group of objects 3 extracted in S530, and it is thus determined that the person 32 visually recognizes the object 3 existing in the direction of line of sight. The object 3 determined to be visually recognized by the person 32 in the example shown in FIGS. 4A and 4B is the crosswalk 30.

Note that the determination in S5420 is performed based on the peripheral information, that is, the detection result of the detection unit 16 obtained in S520, and it does not matter whether or not the person 32 himself/herself actually visually recognizes it.

In S5430, it is determined whether the object 3 determined to be visually recognized by the person 32 in S5420 is an object registered in registration information. Types of objects for which if a certain person visually recognizes the object, the person is generally considered to probably have an intention of crossing are registered in advance in the registration information. If the object 3 determined in S5420 matches one of the objects registered in the registration information, it is determined that the object 3 is registered.

If the object 3 is registered, the process advances to S5440. Otherwise, the process advances to S5450 (skips S5440). Note that in the example shown in FIGS. 4A and 4B, the crosswalk 30 is assumed to be registered in the registration information.

S5430 may be implemented by storage of the registration information in the memory 172 of the prediction ECU 17 or may be implemented by receiving, by the prediction ECU 17, the registration information from an external database or the like.

An object that matches one of the objects registered in the registration information will be expressed as a predetermined object that is not an arbitrary object. Even in a case in which the registration information is not used, the predetermined object can be decided. For example, the same step as S5430 can be implemented by adding attribute information to the object 3 determined to be visually recognized based on the application purpose or function of the object and calculating the association between the attribute information and the possibility of crossing by predetermined information processing.

In S5440, since it is determined in S5430 that the person 32 visually recognizes a predetermined object, it is predicted that the person 32 moves in the crossing direction (starts a crossing operation).

In S5450, the warning region R for the person 32 is set based on the information (for example, position information, state information, and the like) of the person 32 in a case in which S5440 is not performed or based on the prediction result representing that the person 32 moves in the crossing direction in a case in which S5440 is performed. In the example shown in FIG. 4B, since the crossing of the person 32 is predicted in S5440, the warning region R for the person 32 is expanded in the crossing direction (see the arrow E1).

In the above-described way, the behavior prediction of the person 32 is performed by determining whether the person 32 visually recognizes a predetermined object. After that, the warning region R set for the person 32 in this behavior prediction is output to the traveling control ECU 12 as a part of the prediction result in S550.

Note that each step of the flowchart may be changed without departing from the scope of the present invention. For example, the order of the steps may be changed, some steps may be omitted, or another step may be added.

Additionally, in this embodiment, a form in which the behavior prediction of the person 32 is performed when the own vehicle 1 is performing automated driving has been described. However, the behavior prediction may be performed even if the own vehicle 1 is not in the automated driving state. For example, even in a case in which the driver is performing the driving operation by himself/herself, the prediction ECU 17 can perform the behavior prediction of the person 32 and notify the driver of the prediction result.

As described above, according to this embodiment, the prediction ECU 17 acquires the information of the objects 3 (the other vehicle 31, the person 32, the obstacle 33, the crosswalk 30, and the like) existing on the periphery of the own vehicle 1 based on the peripheral information of the own vehicle 1 obtained by the detection unit 16. The information of each object 3 includes, for example, position information (the relative position, the distance, and the like) and state information (the moving direction and speed, and the like). When the person 32 that is the behavior prediction target is confirmed as one of the objects 3, the prediction ECU 17 determines whether the person 32 visually recognizes a predetermined object. Upon determining that the person 32 visually recognizes the predetermined object, the prediction ECU 17 predicts that the person 32 moves in the crossing direction of the road 2. In this embodiment, the crossing of the person 32 is predicted in response to determining that the person 32 visually recognizes the crosswalk 30.

The above-described determining whether the person 32 visually recognizes the predetermined object is done by referring to the types of objects registered in advance as the registration information in this embodiment. The registration information may be held in the memory 172 of the prediction ECU 17 or may be acquired by referring to a database or the like. If the object determined to be visually recognized by the person 32 is an object registered in the registration information, the prediction ECU 17 can determine that the person 32 visually recognizes the predetermined object, and predict crossing of the person 32.

Note that the prediction of crossing of the person 32 is prediction of movement of the person 32 in the crossing direction of the road 2, that is, the person 32 shifts to the crossing operation, and it does not matter whether or not the person 32 actually starts crossing.

According to this embodiment, since the behavior of the person 32 on the road 2 is predicted based on what the person 32 visually recognizes, the accuracy of behavior prediction of the person 32 can be increased.

Second Embodiment

Figure 6A:
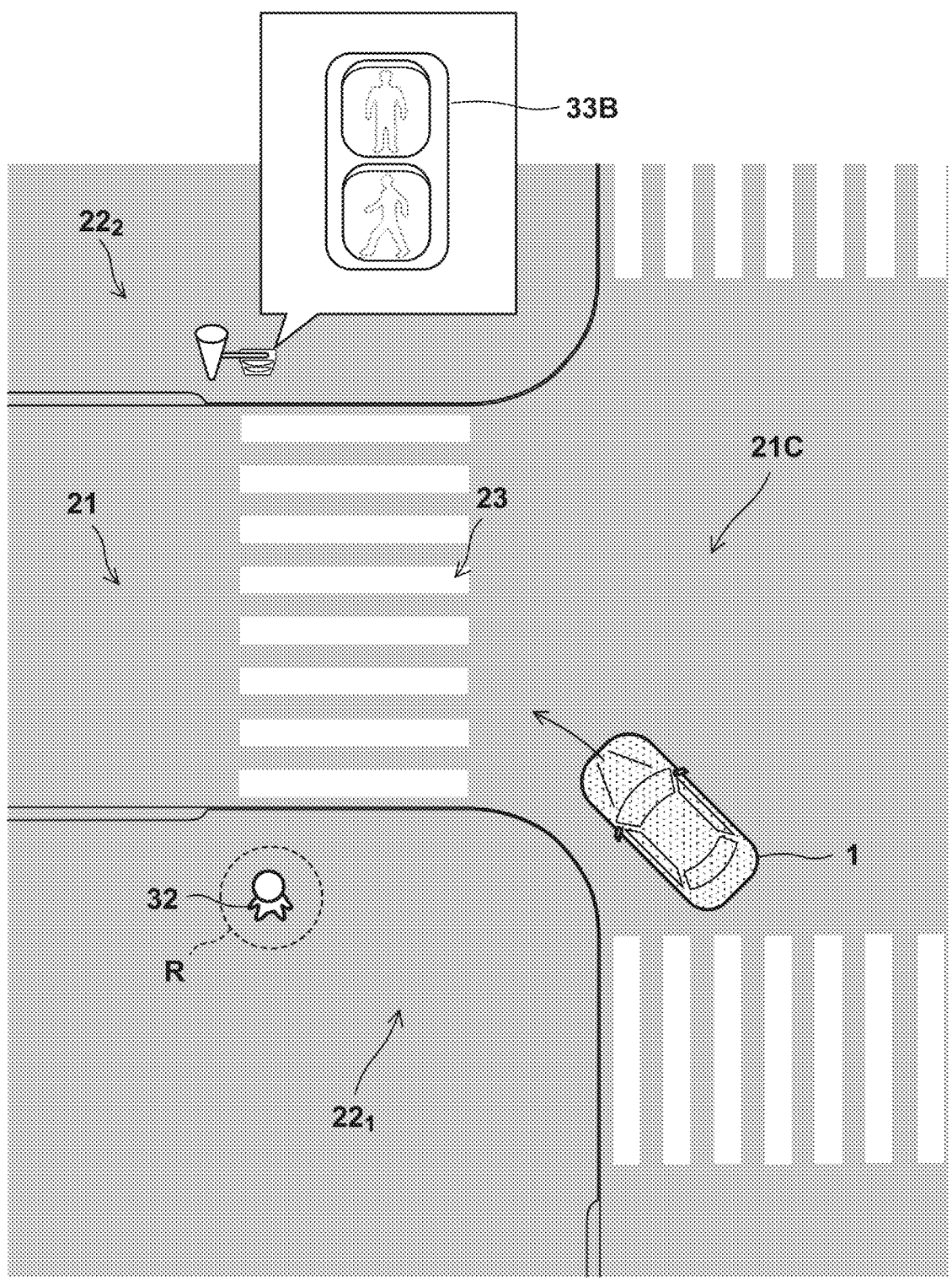
FIG. 6A is a plan view for explaining an example of a method of predicting crossing of a walker.

FIG. 6A is a plan view showing a state in which an own vehicle 1 makes a left turn at an intersection 21C by automated driving as the second embodiment. In this embodiment, a person 32 exists on a sidewalk 22$_1$ on the left side of the own vehicle 1. As in the above-described first embodiment, a warning region R is set for the person 32 by a prediction ECU 17. Additionally, a traffic signal 33B for walkers is provided on a sidewalk 22$_2$ in front of the own vehicle 1 in FIG. 6A, that is, on the sidewalk 22$_2$ on the opposite side of the sidewalk 22$_1$ with respect to a crosswalk 23. Note that traffic signals (traffic signals for vehicles and the like) other than the traffic signal 33B are not illustrated to make it easy to see the drawing.

Figure 6B:
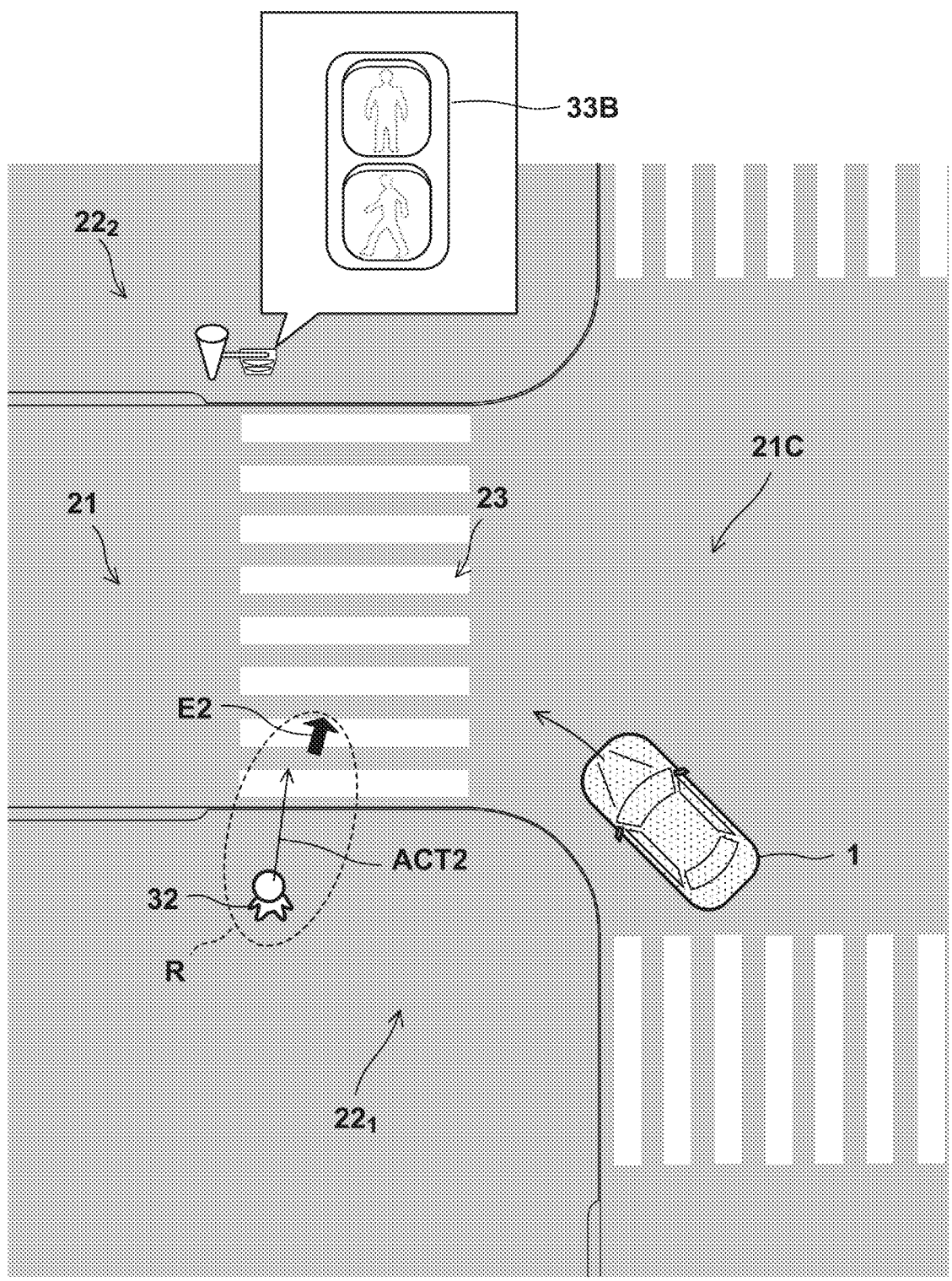
FIG. 6B is a plan view for explaining an example of the method of predicting crossing of the walker.

Here, as shown in FIG. 6B, in a case in which the person 32 visually recognizes the traffic signal 33B (ACT2), it can be considered that the person 32 has a desire to move to the side of the sidewalk 22$_2$ across a roadway 21 through the crosswalk 23. Hence, the traffic signal 33B is registered in registration information in advance, and upon determining that the person 32 visually recognizes the traffic signal 33B (ACT2), the prediction ECU 17 predicts that the person 32 moves in the crossing direction. Based on the prediction result, the prediction ECU 17 sets the warning region R for the person 32, that is, expands the warning region R to the side of the roadway 21, as indicated by an arrow E2.

The prediction ECU 17 can determine the color of a signal shown by the traffic signal 33B based on the detection result of a detection unit 16. In this embodiment, the traffic signal 33B is assumed to be lighting up in green as a color that generally permits the person 32 to cross. However, even in a case in which the traffic signal 33B is blinking in green, the warning region R is expanded in a similar manner.

Note that even if the traffic signal 33B is showing red, the person 32 is considered to visually recognize the traffic signal 33B because he/she has a desire to move to the side of the sidewalk 22$_2$. Hence, even if the traffic signal 33B is showing red, the prediction ECU 17 can expand the warning region R for the person 32. In this case, the expansion width may be smaller than the expansion width in a case in which the traffic signal 33B is showing green.

It is also generally considered that the person 32 will end crossing before the color shown by the traffic signal 33B changes from green to red. For this reason, the prediction ECU 17 further determines the moving direction and/or the moving speed of the person 32, thereby performing behavior prediction of the person 32 at a high accuracy.

For example, if it is determined that the person 32 is moving to the side of the roadway 21 (the side of the crosswalk 23), the possibility that the person 32 starts crossing rises. Hence, the prediction ECU 17 can predict the start of crossing of the person 32 based on the moving direction of the person 32 and further expand the warning region R.

Additionally, for example, if the person 32 maintains the moving speed or increases the moving speed to the side of the roadway 21 (the side of the crosswalk 23), the possibility that the person 32 starts crossing rises. Hence, the prediction ECU 17 can predict the start of crossing of the person 32 based on the moving speed of the person 32 and further expand the warning region R.

In this embodiment, the prediction ECU 17 can determine the color of the signal shown by the traffic signal 33B based on the detection result of the detection unit 16. As another embodiment, the color of the signal shown by the traffic signal 33B may be confirmed by external communication (for example, road-to-vehicle communication). For example, the prediction ECU 17 can also confirm the color of the signal shown by the traffic signal 33B by directly/indirectly receiving information representing it from the traffic signal 33B.

According to this embodiment, upon determining that the person 32 visually recognizes the traffic signal 33B, the prediction ECU 17 predicts the movement of the person 32 in the crossing direction and expands the warning region R for the person 32. This makes it possible to perform behavior prediction of the person 32 at a high accuracy, as in the first embodiment.

Third Embodiment

In the above-described first and second embodiments, when it is determined that the person 32 visually recognizes a predetermined object (in the above-described examples, an object registered in registration information), crossing of the person 32 is predicted. However, the predetermined object is not limited to an object that can be visually recognized when the person has an intention of crossing. For example, it can also be considered that the person 32 starts crossing to implement some purpose, although he/she does not have the intention of crossing. For example, a child is considered to unexpectedly start moving to the side of a guardian (a parent, a nursery school teacher, or the like). A case in which the predetermined object is a person will be described below as the third embodiment.

Figure 7A:
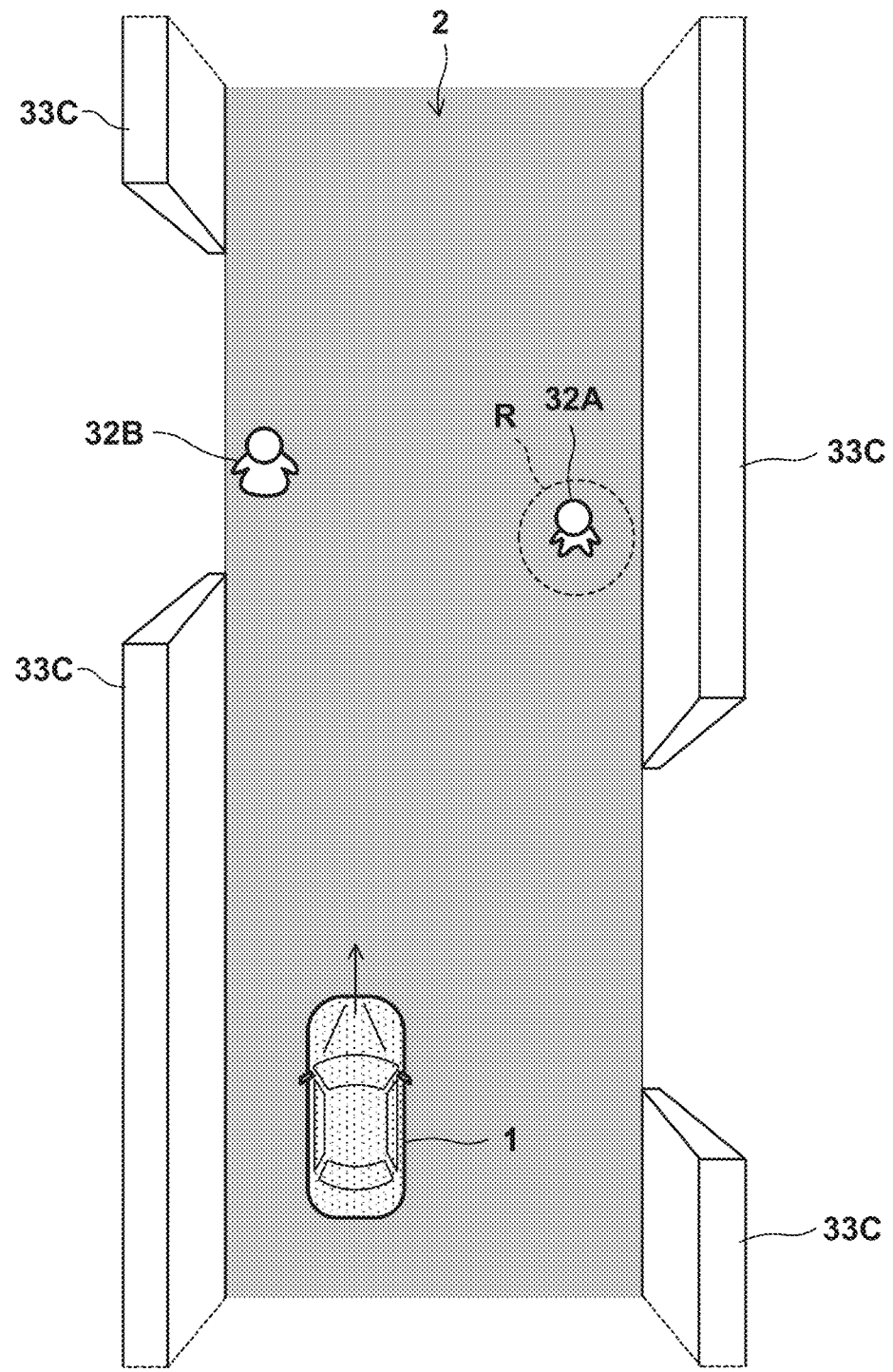
FIG. 7A is a plan view for explaining an example of a method of predicting crossing of a walker.

FIG. 7A is a plan view showing a state in which an own vehicle 1 is traveling by automated driving on a road 2 surrounded by walls 33C. Note that in this embodiment, the road 2 is not provided with a partition between a sidewalk and a roadway. Persons (one will be referred to as a "person 32A", and the other will be referred to as a "person 32B" for the sake of discrimination) exist on both sides of the road 2 in front of the own vehicle 1. In this embodiment, the person 32A is assumed to be a child, and the person 32B is assumed to be a guardian.

Figure 7B:
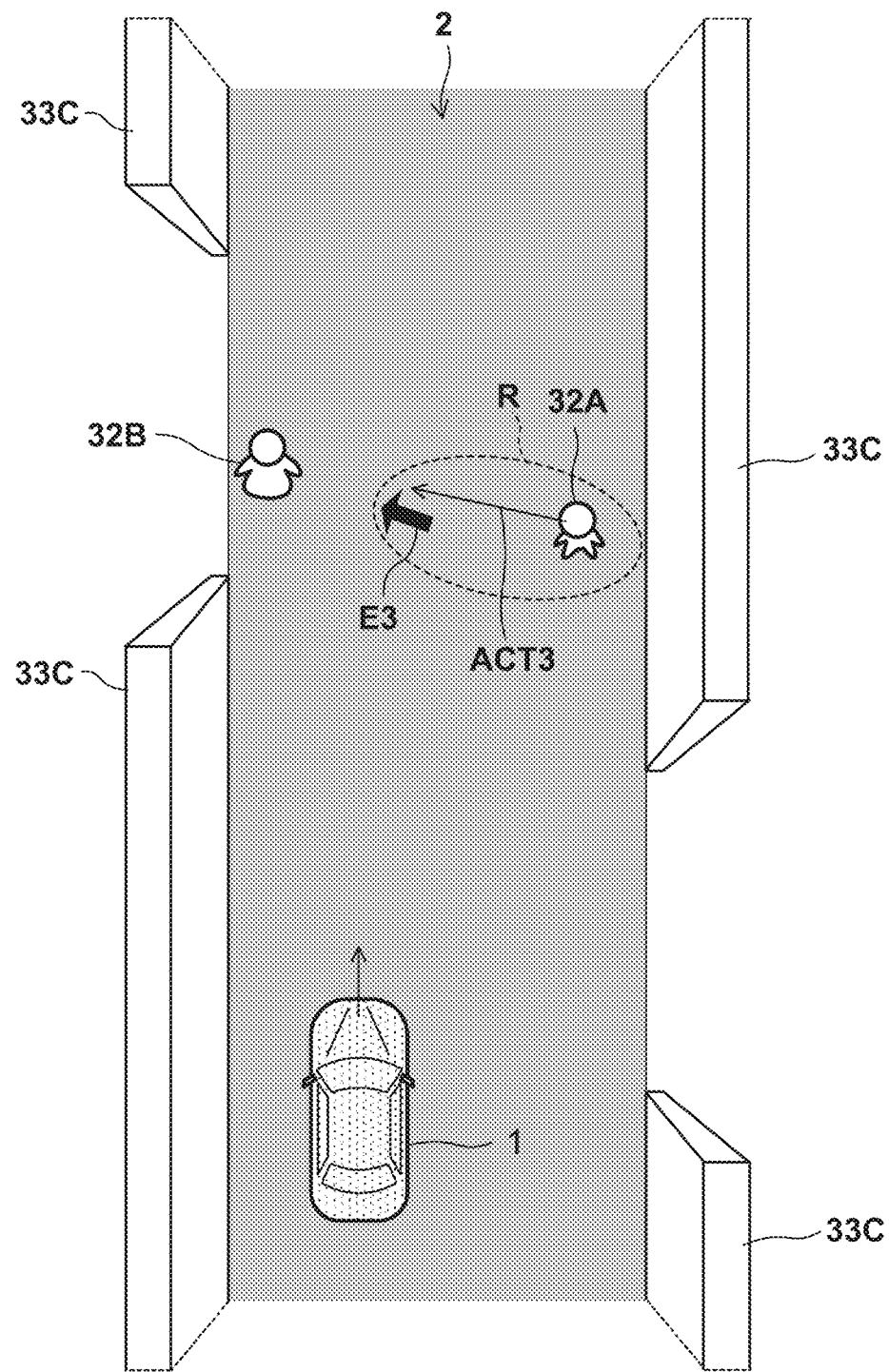
FIG. 7B is a plan view for explaining an example of the method of predicting crossing of the walker.

Here, as shown in FIG. 7B, in a case in which the person 32A visually recognizes the person 32B (ACT3), there is a possibility that the person 32A moves to the side of the person 32B across the road 2. Hence, upon determining that the person 32A visually recognizes the person 32B (ACT3), a prediction ECU 17 predicts that the person 32A moves in the crossing direction. Based on the prediction result, the prediction ECU 17 sets a warning region R for the person 32A, that is, expands the warning region R to the side of the person 32B, as indicated by an arrow E3.

In the example shown in FIGS. 7A and 7B, a case in which the person 32A is a child, and the person 32B is a guardian has been assumed. However, the same prediction is possible even in a case in which the person 32A is a guardian, and the person 32B is a child, or persons 32A and 32B have friendly relations.

In this embodiment, the prediction ECU 17 can further determine whether the persons 32A and 32B meet a predetermined condition, that is, the relationship between the persons 32A and 32B, and predicts crossing of the person 32A based on the result. Determining whether the persons 32A and 32B meet the predetermined condition is performed after S5430 and before S5450 in the flowchart of FIG. 5B.

The prediction ECU 17 can perform the determination based on, for example, the position condition of the persons 32A and 32B. The determination is done based on, for example, the relative positions of the persons 32A and 32B, the positions of the persons 32A and 32B relative to the own vehicle 1, and the like. In this embodiment, as the position condition, a condition that the persons 32A and 32B are located on both sides of the road 2 on which the own vehicle 1 is traveling is used. This makes it possible to appropriate predict crossing of the person 32A.

The prediction ECU 17 can also perform the determination based on, for example, the outer appearance condition of the persons 32A and 32B. The outer appearance condition need only be a condition that enables determination based on the features of the outer appearances of the persons 32A and 32B. The outer appearance condition need only be a condition that enables estimation that the persons 32A and 32B have a certain relationship, and includes, for example, a physique condition and/or a clothing condition. Examples of the physique condition are a condition that the height of one person is relatively small, and the height of the other person is relatively large (the persons are estimated to have the relationship of a child and a guardian) and a condition that the heights of both persons are relatively small (both persons are estimated as children). In addition, examples of the clothing condition are a condition that one person has clothing designed for a children, and the other person has clothing designed for adults (the persons are estimated to have the relationship of a child and a guardian) and a condition that one person has clothing designed for men, and the other person has clothing designed for women (the persons are estimated to have friendly relations).

According to this embodiment, upon determining that the person 32A visually recognizes the person 32B, the prediction ECU 17 predicts the movement of the person 32A in the crossing direction and expands the warning region R for the person 32A. This makes it possible to perform behavior prediction of the person 32A at a high accuracy, as in the first embodiment.

Fourth Embodiment

In the above-described first to third embodiments, when it is determined that the person 32 visually recognizes a predetermined object, crossing of the person 32 is predicted. As the predetermined object, the crosswalk 30 has been exemplified in the first embodiment, the traffic signal 33B has been exemplified in the second embodiment, and the person 32B has been exemplified in the third embodiment. The predetermined object need not always be located on a road 2 and may be a belonging to a person 32. That is, even in a case in which it is determined that the person 32 visually recognizes a belonging to the person 32, a prediction ECU 17 can perform the prediction and expand a warning region R for the person 32. Examples of the belonging are an object that can be gripped by a hand and an object that can be attached to a part of the body, and include, for example, electronic devices such as a portable terminal, a wristwatch, and a music player and documents such as a book and a magazine.

Fifth Embodiment

In the above-described first to fourth embodiments, when it is determined that the person 32 visually recognizes a predetermined object, crossing of the person 32 is predicted. However, if an object that interrupts crossing does not exist, crossing may be started regardless of the presence/absence of visual recognition of the predetermined object.

Figure 8A:
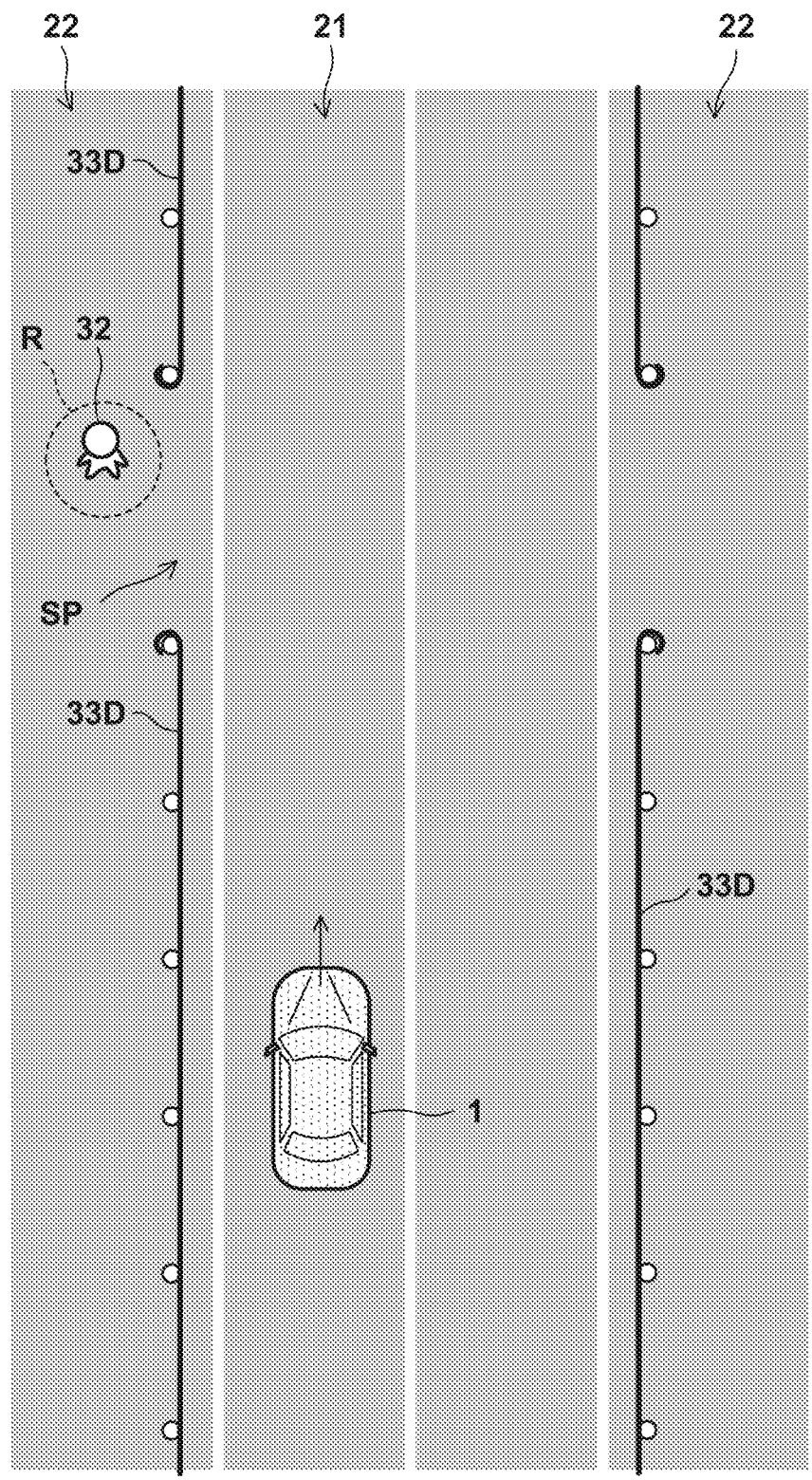
FIG. 8A is a plan view for explaining an example of a method of predicting crossing of a walker.

FIG. 8A is a plan view showing a state in which an own vehicle 1 is traveling on a roadway 21 by automated driving as the fifth embodiment. In this embodiment, sidewalks 22 are partitioned from the roadway 21 by partition members 33D. In this embodiment, each partition member 33D is a guard fence (for example, a guardrail, a guard pipe, or the like). As another embodiment, the partition member 33D may be a curb or a shrubbery, or may be formed using at least two of a guard fence, a curb, and a shrubbery.

The partition member 33D is provided with a gap SP capable of passing a walker. In this embodiment, a person 32 exists near the gap SP on the sidewalk 22. As in the above-described first embodiment, the prediction ECU 17 sets a warning region R for the person 32.

Figure 8B:
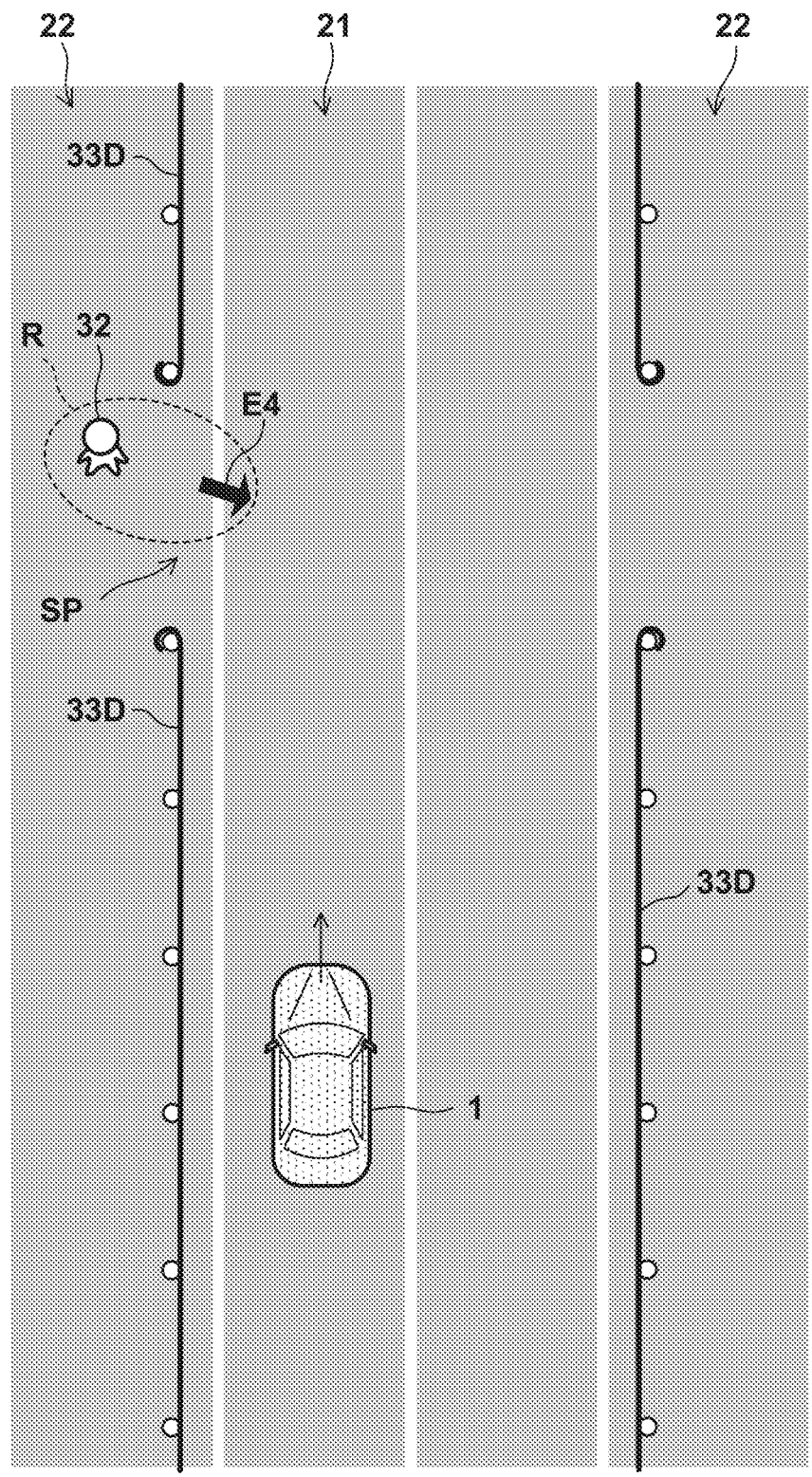
FIG. 8B is a plan view for explaining an example of the method of predicting crossing of the walker.

Here, as shown in FIG. 8B, in a case in which the person 32 exists near the gap SP, there is a possibility that the person 32 has a desire to move across the roadway 21 through the gap SP. Hence, in a case in which it is confirmed that the person 32 exists within the range of a predetermined distance from the gap SP, the prediction ECU 17 predicts that the person 32 moves in the crossing direction through the gap SP and expands the warning region R to the side of the roadway 21, as indicated by an arrow E4.

According to this embodiment, the arrangement form of the partition member 33D is considered, and crossing of the person 32 is predicted based on the presence/absence of the gap SP in the partition member 33D. For this reason, according to this embodiment, it is possible to perform behavior prediction of the person 32 at a high accuracy.

The contents of this embodiment can be applied to the first to fourth embodiments. For example, as another embodiment, in a case in which the own vehicle 1 is traveling on the roadway 21 partitioned by the partition members 33D, using confirmation of the gap SP as one condition, the prediction ECU 17 may predict crossing of the person 32 based on what the person 32 visually recognizes. As still another embodiment, the prediction ECU 17 may predict crossing of the person 32 upon determining that the gap SP is located in the direction of line of sight of the person 32.

Other Embodiments

Several preferred embodiments have been described above. However, the present invention is not limited to these examples and may partially be modified without departing from the scope of the invention. For example, another element may be combined with the contents of each embodiment in accordance with the object, application purpose, and the like. Part of the contents of a certain embodiment may be combined with the contents of another embodiment. In addition, individual terms described in this specification are merely used for the purpose of explaining the present invention, and the present invention is not limited to the strict meanings of the terms and can also incorporate their equivalents.

Furthermore, a program that implements at least one function described in each embodiment is supplied to a system or an apparatus via a network or a storage medium, and at least one processor in the computer of the system or the apparatus can read out and execute the program. The present invention can be implemented by this form as well.

SUMMARY OF EMBODIMENTS

The first aspect is directed to a prediction apparatus (for example, 17), and the prediction apparatus comprises an acquisition unit (for example, 171, S520) configured to acquire peripheral information of an own vehicle (for example, 1), a determination unit (for example, 171, S5420-S5430) configured to determine, based on the peripheral information, whether a behavior prediction target (for example, 32, 32A) on a road (for example, 2) visually recognizes a predetermined object (for example, 3, 30, 32B, 33B), and a prediction unit (for example, 171, S5440) configured to, if it is determined by the determination unit that the behavior prediction target visually recognizes the predetermined object, predict that the behavior prediction target moves across the road in a crossing direction.

According to the first aspect, the behavior of a person (behavior prediction target) on the road is predicted based on what the person visually recognizes. Hence, according to the first aspect, it is possible to increase the accuracy of behavior prediction of the person.

In the second aspect, the determination unit refers to registration information (for example, 172) in which a type of an object is registered, and if an object existing in a direction of line of sight of the behavior prediction target is registered in the registration information, determines that the behavior prediction target visually recognizes the predetermined object.

According to the second aspect, if it is determined that the person who is the behavior prediction target visually recognizes an object registered in the registration information, it is determined that there is a possibility that the person moves in the crossing direction, and the prediction is performed. Hence, according to the second aspect, it is possible to perform the prediction at a higher accuracy.

In the third aspect, the predetermined object includes a crosswalk (for example, 30).

According to the third aspect, if it is determined that the person who is the behavior prediction target visually recognizes a crosswalk, it is determined that there is a possibility that the person moves in the crossing direction, and the prediction is performed. Hence, according to the third aspect, it is possible to perform the prediction at a higher accuracy.

In the fourth aspect, the predetermined object includes a traffic signal (for example, 33B).

According to the fourth aspect, if it is determined that the person who is the behavior prediction target visually recognizes a traffic signal, it is determined that there is a possibility that the person moves in the crossing direction, and the prediction is performed. Hence, according to the third aspect, it is possible to perform the prediction at a higher accuracy.

In the fifth aspect, the determination unit can further determine a color shown by the traffic signal, and if it is further determined by the determination unit that the traffic signal is showing green, the prediction unit predicts that the behavior prediction target moves across the road in the crossing direction.

According to the fifth aspect, the prediction is performed in consideration of the color shown by the traffic signal. If the traffic signal shows green, it is considered that there is a possibility that the person who is the behavior prediction target moves in the crossing direction. Hence, according to the fifth aspect, it is possible to perform the prediction at a higher accuracy. Note that the green shown by the traffic signal includes not only lighting in green but also blinking in green.

In the sixth aspect, the determination unit can further determine a moving direction of the behavior prediction target, and if it is further determined by the determination unit that the behavior prediction target moves to a side of a roadway (for example, 21), the prediction unit predicts that the behavior prediction target crosses the roadway.

According to the sixth aspect, the prediction is performed in consideration of the moving direction of the person who is the behavior prediction target. Hence, according to the sixth aspect, it is possible to perform the prediction at a higher accuracy.

In the seventh aspect, the determination unit can further determine a moving speed of the behavior prediction target, and if it is further determined by the determination unit that the behavior prediction target maintains the moving speed or increases the moving speed to a side of a roadway (for example, 21), the prediction unit predicts that the behavior prediction target crosses the roadway.

According to the seventh aspect, the prediction is performed in consideration of the moving speed of the person who is the behavior prediction target, that is, based on whether the moving speed of the person decreases. Hence, according to the seventh aspect, it is possible to perform the prediction at a higher accuracy.

In the eighth aspect, the predetermined object includes a person (for example, 32B).

According to the eighth aspect, if it is determined that the person (32A) who is the behavior prediction target visually recognizes another person (32B), it is determined that there is a possibility that the person who is the behavior prediction target moves in the crossing direction, and the prediction is performed. Hence, according to the eighth aspect, it is possible to perform the prediction at a higher accuracy.

In the ninth aspect, the determination unit can further determine whether the behavior prediction target and the person meet a predetermined condition, and if it is further determined by the determination unit that the predetermined condition is met, the prediction unit predicts that the behavior prediction target moves across the road in the crossing direction.

According to the ninth aspect, if the person (32A) who is the behavior prediction target and another person (32B) determined to be visually recognized by the person meet a predetermined condition, it is determined that there is a possibility that the person who is the behavior prediction target moves in the crossing direction, and the prediction is performed. Hence, according to the ninth aspect, it is possible to perform the prediction at a higher accuracy.

In the 10th aspect, the predetermined condition includes a position condition of the behavior prediction target and the person.

According to the 10th aspect, the prediction is performed based on the position condition between the person (32A) who is the behavior prediction target and the other person (32B) determined to be visually recognized by the person, for example, the relative positions of the persons or the positions of the persons relative to the own vehicle. Hence, according to the 10th aspect, it is possible to perform the prediction at a higher accuracy.

In the 11th aspect, the position condition includes a condition that the behavior prediction target and the person exist on both sides of the road.

According to the 11th aspect, the prediction is performed when the person (32A) who is the behavior prediction target and the other person (32B) determined to be visually recognized by the person exist on both sides of the road. Note that the 11th aspect is applicable not only to a case in which the road is formed from a roadway and a sidewalk but also to a case in which a partition between a roadway and a sidewalk does not exist.

In the 12th aspect, the predetermined condition includes an outer appearance condition of the behavior prediction target and the person.

According to the 12th aspect, if the person (32A) who is the behavior prediction target and another person (32B) determined to be visually recognized by the person meet a predetermined outer appearance condition, the prediction is performed. Hence, according to the 12th aspect, it is possible to perform the prediction at a higher accuracy. Note that the predetermined outer appearance condition need only be a condition that makes it possible to determine, based on the features of the outer appearances, that there is a possibility of existence of some relationship between the persons.

In the 13th aspect, the outer appearance condition includes a physique condition and/or a clothing condition.

According to the 13th aspect, if the person (32A) who is the behavior prediction target and another person (32B) determined to be visually recognized by the person meet a predetermined a physique condition and/or clothing condition, the prediction is performed. Hence, according to the 13th aspect, it is possible to perform the prediction at a higher accuracy.

In the 14th aspect, the determination unit can further determine an arrangement form of a partition member (for example, 33D) configured to partition a roadway (for example, 21) and a sidewalk (for example, 22), and if it is further determined by the determination unit that the partition member is provided with a gap (for example, SP) capable of passing the behavior prediction target, the prediction unit predicts that the behavior prediction target moves from a side of the sidewalk to a side of the roadway through the gap.

According to the 14th aspect, the prediction is performed in consideration of the arrangement form of the partition member. If the partition member is provided with the gap, it can be considered that there is a possibility that the person who is the behavior prediction target moves from the gap in the crossing direction. Hence, according to the 14th aspect, it is possible to perform the prediction at a higher accuracy.

In the 15th aspect, the partition member includes at least one of a guard fence, a curb, and a shrubbery.

According to the 15th aspect, the prediction based on the 14th aspect can be performed at a higher accuracy. Examples of the guard fence are a guardrail and a guard pipe. In addition, the roadway and the sidewalk are often partitioned by a curb, a shrubbery, or the like. In this case as well, the prediction is suitably performed.

In the 16th aspect, the prediction apparatus further comprises a setting unit (for example, 171, S5450) configured to set a warning region (for example, R) for the behavior prediction target based on a result of the prediction by the prediction unit.

According to the 16th aspect, the warning region for the person who is the behavior prediction target is set based on the result of the prediction according to each aspect described above. This makes it possible to perform driving while ensuring the distance to the person who is the behavior prediction target and implement safe driving.

The 17th aspect is directed to a vehicle, and the vehicle comprises a detection unit (for example, 16) configured to detect peripheral information of an own vehicle, a determination unit (for example, 171, S5420-S5430) configured to determine, based on the peripheral information detected by the detection unit, whether a behavior prediction target (for example, 32, 32A) on a road (for example, 2) visually recognizes a predetermined object (for example, 3, 30, 32B, 33B), and a prediction unit (for example, 171, S5440) configured to, if it is determined by the determination unit that the behavior prediction target visually recognizes the predetermined object, predict that the behavior prediction target moves across the road in a crossing direction.

According to the 17th aspect, since the behavior of a person (behavior prediction target) on the road is predicted based on what the person visually recognizes, as in the first aspect, the behavior can be predicted at a high accuracy.

The 18th aspect is directed to a prediction method, and the prediction method comprises acquiring (for example, S520) peripheral information of an own vehicle (for example, 1), determining (for example, S5420-S5430), based on the peripheral information, whether a behavior prediction target (for example, 32, 32A) on a road (for example, 2) visually recognizes a predetermined object (for example, 3, 30, 32B, 33B), and if it is determined in the determining that the behavior prediction target visually recognizes the predetermined object, predicting (for example, S5440) that the behavior prediction target moves across the road in a crossing direction.

According to the 18th aspect, since the behavior of a person (behavior prediction target) on the road is predicted based on what the person visually recognizes, as in the first aspect, the behavior can be predicted at a high accuracy.

According to the 19th aspect, there is provided a non-transitory computer-readable storage medium on which is stored a program for causing a computer to perform each step.

According to the 19th aspect, the 18th aspect can be implemented by the computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-109302, filed on Jun. 1, 2017, which is hereby incorporated by reference herein in its entirety.

What is claimed is:

1. A prediction apparatus comprising a central processing unit (CPU) and a memory, configured to function as:
   an acquisition unit configured to acquire peripheral information of an own vehicle;

a determination unit configured to determine, based on the peripheral information, whether a behavior prediction target on a road visually recognizes a predetermined object; and a prediction unit configured to, when it is determined by the determination unit that the behavior prediction target visually recognizes the predetermined object, predict that the behavior prediction target moves across the road in a crossing direction, wherein the predetermined object is a crosswalk.

2. The apparatus according to claim 1, wherein the determination unit refers to registration information in which a type of an object is registered, and when an object existing in a direction of line of sight of the behavior prediction target is registered in the registration information, determines that the behavior prediction target visually recognizes the predetermined object.

3. A prediction apparatus comprising a central processing unit (CPU) and a memory, configured to function as:

an acquisition unit configured to acquire peripheral information of an own vehicle;

a determination unit configured to determine, based on the peripheral information, whether a behavior prediction target on a road visually recognizes a predetermined object; and a prediction unit configured to, when it is determined by the determination unit that the behavior prediction target visually recognizes the predetermined object, predict that the behavior prediction target moves across the road in a crossing direction, wherein the predetermined object is a traffic signal.

4. The apparatus according to claim 3, wherein the determination unit further determines a color shown by the traffic signal, and when it is further determined by the determination unit that the traffic signal is showing green, the prediction unit predicts that the behavior prediction target moves across the road in the crossing direction.

5. The apparatus according to claim 3, wherein the determination unit further determines a moving direction of the behavior prediction target, and when it is further determined by the determination unit that the behavior prediction target moves to a side of a roadway, the prediction unit predicts that the behavior prediction target crosses the roadway.

6. The apparatus according to claim 1, wherein the determination unit further determines a moving speed of the behavior prediction target, and when it is further determined by the determination unit that the behavior prediction target maintains the moving speed or increases the moving speed to a side of a roadway, the prediction unit predicts that the behavior prediction target crosses the roadway.

7. A prediction apparatus comprising a central processing unit (CPU) and a memory, configured to function as:

an acquisition unit configured to acquire peripheral information of an own vehicle;

a determination unit configured to determine, based on the peripheral information, whether a behavior prediction target on a road visually recognizes a predetermined object; and a prediction unit configured to, when it is determined by the determination unit that the behavior prediction target visually recognizes the predetermined object, predict that the behavior prediction target moves across the road in a crossing direction, wherein the predetermined object is a person.

8. The apparatus according to claim 7, wherein the determination unit further determines whether the behavior prediction target and the person meet a predetermined condition, and when it is further determined by the determination unit that the predetermined condition is met, the prediction unit predicts that the behavior prediction target moves across the road in the crossing direction.

9. The apparatus according to claim 8, wherein the predetermined condition includes a position condition of the behavior prediction target and the person.

10. The apparatus according to claim 9, wherein the position condition includes a condition that the behavior prediction target and the person exist on both sides of the road.

11. The apparatus according to claim 8, wherein the predetermined condition includes an outer appearance condition of the behavior prediction target and the person.

12. The apparatus according to claim 11, wherein the outer appearance condition includes a physique condition and/or a clothing condition.

13. The apparatus according to claim 1, wherein the determination unit further determines an arrangement form of a partition member configured to partition a roadway and a sidewalk, and when it is further determined by the determination unit that the partition member is provided with a gap capable of passing the behavior prediction target, the prediction unit predicts that the behavior prediction target moves from a side of the sidewalk to a side of the roadway through the gap.

14. The apparatus according to claim 13, wherein the partition member includes at least one of a guard fence, a curb, and a shrubbery.

15. The apparatus according to claim 1, further comprising a setting unit configured to set a warning region for the behavior prediction target based on a result of the prediction by the prediction unit.

* * * * *